(12) United States Patent
Fernando et al.

(10) Patent No.: US 9,455,908 B2
(45) Date of Patent: Sep. 27, 2016

(54) BI-DIRECTIONAL FLOW STICKINESS IN A NETWORK ENVIRONMENT

(71) Applicant: CISCO TECHNOLOGY, INC., San Jose, CA (US)

(72) Inventors: Rex Emmanuel Fernando, Dublin, CA (US); Dhananjaya Rao, San Jose, CA (US); Sami Boutros, Dublin, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 69 days.

(21) Appl. No.: 14/325,059

(22) Filed: Jul. 7, 2014

(65) Prior Publication Data

US 2016/0006654 A1 Jan. 7, 2016

(51) Int. Cl.
*H04L 12/721* (2013.01)
*H04L 12/741* (2013.01)
*H04L 12/733* (2013.01)
*H04L 12/715* (2013.01)

(52) U.S. Cl.
CPC ............... *H04L 45/74* (2013.01); *H04L 45/20* (2013.01); *H04L 45/36* (2013.01); *H04L 45/38* (2013.01); *H04L 45/04* (2013.01)

(58) Field of Classification Search
None
See application file for complete search history.

(56) References Cited

U.S. PATENT DOCUMENTS

| 6,381,646 | B2 * | 4/2002 | Zhang | H04L 29/06 709/227 |
| 6,778,524 | B1 * | 8/2004 | Augart | H04L 29/06 370/248 |
| 7,043,564 | B1 * | 5/2006 | Cook | H04L 29/12009 709/223 |

(Continued)

FOREIGN PATENT DOCUMENTS

WO    WO2016/007274    1/2016

OTHER PUBLICATIONS

PCT Oct. 9, 2015 International Search Report and Written Opinion from International Application No. PCT/US2015/036849.

(Continued)

*Primary Examiner* — Hassan Kizou
*Assistant Examiner* — Tejis Daya
(74) *Attorney, Agent, or Firm* — Patent Capital Group

(57) ABSTRACT

An example method for bi-directional flow stickiness in a network environment is provided and includes receiving a packet of a flow from a source address in a network, and destined to a destination address outside the network, looking up a flow table for an entry corresponding to the flow, and caching a forward flow entry and a reverse flow entry in the flow table if the look up results in a miss, the forward flow entry indicating a routing lookup, and the reverse flow entry indicating a previous hop from which the packet was received to maintain a bi-directional flow stickiness. Some embodiments also include receiving another packet from the destination address outside the network destined to the source address in the network, and forwarding it to the previous hop listed in the reverse flow entry.

20 Claims, 7 Drawing Sheets

(56) References Cited

U.S. PATENT DOCUMENTS

| | | | |
|---|---|---|---|
| 7,543,052 B1* | 6/2009 | Cesa | H04L 43/026 709/223 |
| 7,672,236 B1* | 3/2010 | Karunakaran | H04L 12/4625 370/230.1 |
| 7,738,469 B1 | 6/2010 | Shekokar et al. | |
| 7,784,055 B2 | 8/2010 | Srivastava | |
| 8,767,757 B1* | 7/2014 | Chudgar | H04L 45/745 370/256 |
| 8,804,736 B1* | 8/2014 | Drake | H04L 12/462 370/392 |
| 8,942,235 B1* | 1/2015 | Vinapamula Venkata | H04L 63/02 370/254 |
| 2001/0051865 A1 | 12/2001 | Kerr et al. | |
| 2003/0236913 A1* | 12/2003 | Hoban | H04L 29/12462 709/238 |
| 2006/0153225 A1* | 7/2006 | Kamiya | H04L 49/25 370/463 |
| 2006/0187912 A1* | 8/2006 | Schwartz | H04L 29/12009 370/389 |
| 2007/0162968 A1* | 7/2007 | Ferreira | H04L 29/12481 726/12 |
| 2007/0248065 A1* | 10/2007 | Banerjea | H04L 45/26 370/338 |
| 2010/0150005 A1* | 6/2010 | Gerber | H04L 41/12 370/252 |
| 2010/0284403 A1* | 11/2010 | Scudder | H04L 45/124 370/392 |
| 2011/0080830 A1* | 4/2011 | Ko | H04L 45/38 370/235 |
| 2011/0110373 A1* | 5/2011 | Ghosh | H04L 45/02 370/392 |
| 2011/0131308 A1* | 6/2011 | Eriksson | H04L 67/14 709/223 |
| 2012/0207175 A1* | 8/2012 | Raman | H04L 47/125 370/412 |
| 2013/0155902 A1* | 6/2013 | Feng | H04L 67/1031 370/255 |
| 2013/0191552 A1* | 7/2013 | Patterson | H04L 45/12 709/241 |
| 2013/0272305 A1 | 10/2013 | Lefebvre et al. | |
| 2013/0290622 A1* | 10/2013 | Dey | G11C 15/00 711/108 |
| 2013/0297798 A1 | 11/2013 | Arisoylu et al. | |
| 2014/0098675 A1 | 4/2014 | Frost et al. | |
| 2014/0169370 A1 | 6/2014 | Filsfils et al. | |
| 2014/0215560 A1* | 7/2014 | Roberson | H04L 63/02 726/3 |
| 2014/0269266 A1 | 9/2014 | Filsfils et al. | |
| 2014/0269421 A1 | 9/2014 | Previdi et al. | |
| 2014/0269698 A1 | 9/2014 | Filsfils et al. | |
| 2014/0269721 A1 | 9/2014 | Bashandy et al. | |
| 2014/0317259 A1 | 10/2014 | Previdi et al. | |
| 2015/0052575 A1* | 2/2015 | Myla | H04L 63/0227 726/1 |

OTHER PUBLICATIONS

"OpenFlow Switch Specification," Feb. 28, 2011, XP055132070, Sections 2, 4.1.1 http://archive.openflow.org/documents/openflow-spec-v1.1.0.pdf.

Bitar, N., et al., "Interface to the Routing System I2RS) for Service Chaining: Use Cases and Requirements," Internet Engineering Task Force Internet Draft draft-bitar-i2rs-service-chaining-01, Feb. 14, 2014; 15 pages.

Fernando, R., et al., "Virtual Topologies for Service Chaining in BGP/IP MPLS VPNs," Internet Draft draft-rfernando-advpn-service-chaining-04, Jul. 4, 2014; 18 pages.

S. Sivabalan, et al., "PCE-Initiated Traffic Engineering Path Setup in Segment Routed Networks", Network Working Group, Internet-Draft, Jun. 17, 2013, 16 pages; https://tools.ietf.org/html/draft-sivabalan-pce-segment-routing-00.

S. Sivabalan, et al., "PCEP Extensions for Segment Routing", Network Working Group, Internet-Draft, Jul. 12, 2013, 20 pages; https://tools.ietf.org/html/draft-sivabalan-pce-segment-routing-01.

* cited by examiner

BI-DIRECTIONAL FLOW STICKINESS IN A NETWORK ENVIRONMENT

TECHNICAL FIELD

This disclosure relates in general to the field of communications and, more particularly, to bi-directional flow stickiness in a network environment.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for bi-directional flow stickiness in a network environment is provided and includes receiving a packet of a flow from a source address in a network, and destined to a destination address outside the network, looking up a flow table for an entry corresponding to the flow, and caching a forward flow entry and a reverse flow entry in the flow table if the look up results in a miss, the forward flow entry indicating a next action to be performed on the packet, and the reverse flow entry indicating a previous hop from which the packet was received to maintain a bi-directional flow stickiness. Some embodiments also include receiving another packet from the destination address outside the network destined to the source address in the network, and forwarding it to the previous hop listed in the reverse flow entry.

As used herein, the term "flow" can be inclusive of a stream of packets. Substantially all packets belonging to a specific flow may have a set of common properties. Each property can be a result of applying a function to one or more packet header fields (e.g., destination IP address), transport header fields (e.g., destination port number), or application header fields (e.g., real-time protocol (RTP) header fields; one or more characteristics of the packet (e.g., number of multiprotocol label switching (MPLS) labels); or one or more fields derived from packet treatment (e.g., next hop IP address, output interface). In many embodiments, each flow may be identified by a unique 5-tuple, comprising, for example, protocol, source Internet Protocol (IP) address, source port, destination IP address, and destination port. A packet may be characterized as belonging to a particular flow if it satisfies substantially all properties of that flow. For example, packets with the same 5-tuple may belong to the same flow.

Example Embodiments

Figure 1:
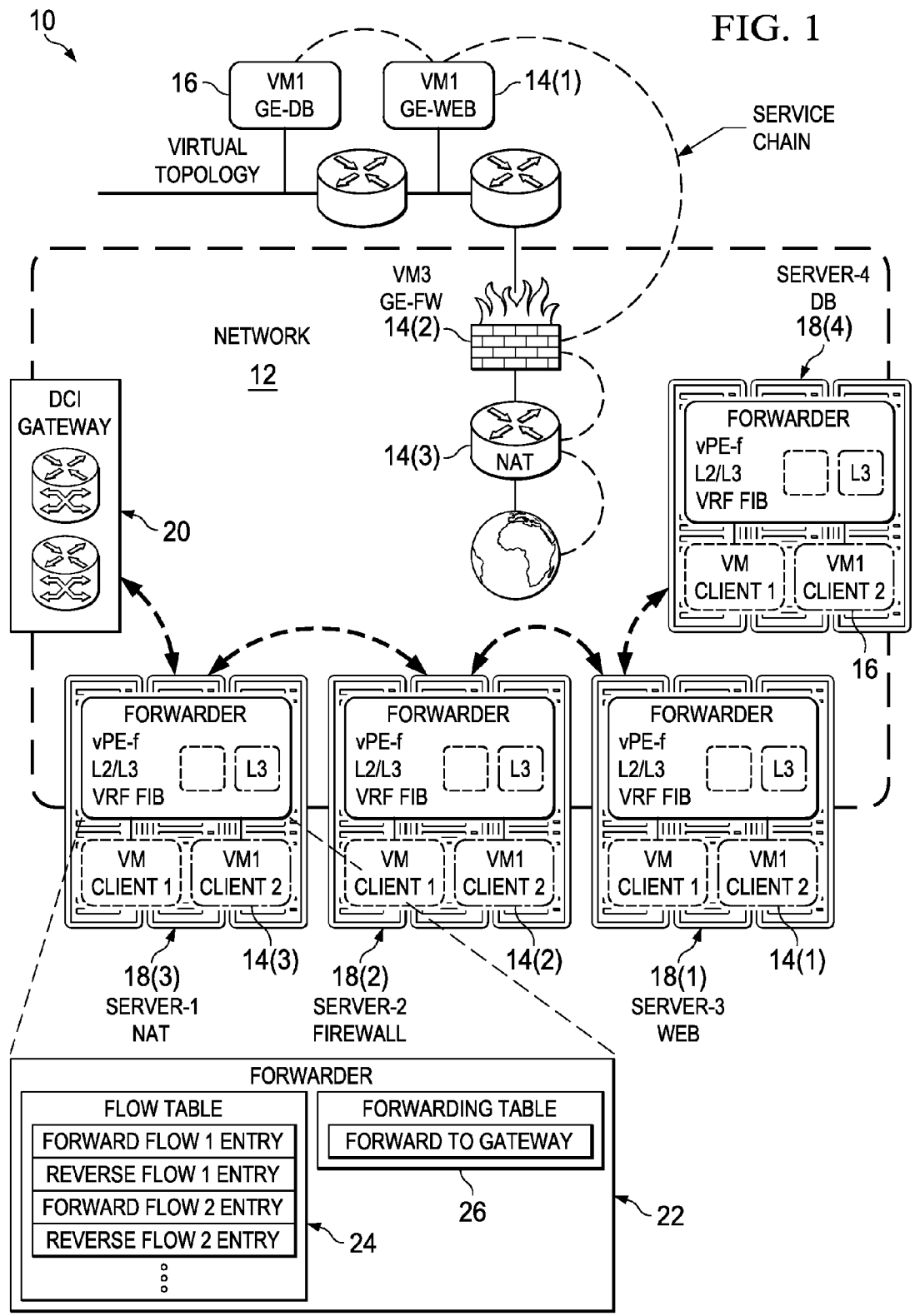
FIG. 1 is a simplified block diagram illustrating a communication system for bi-directional flow stickiness in a network environment.

Turning to FIG. 1, FIG. 1 is a simplified block diagram illustrating a communication system 10 for bi-directional flow stickiness in a network environment in accordance with one example embodiment. FIG. 1 illustrates a network 12 comprising a plurality of service nodes (e.g., 14(1)-14(3)) that serve flows within network 12. For example, a flow from/to a source node 16 may pass through service nodes 14(1)-14(3) as it traverses network 12; each service node 14(1)-14(3) may perform one or more services on the flow. It may be noted that although only three service nodes and one source node are shown in the figure, any number of service nodes and source nodes may be instantiated within network 12.

Assume, merely for the sake of example and not as a limitation, that a packet sent from source node 16 is destined to a node outside network 12, and passes through service nodes 14(1)-14(3) sequentially, exiting out of network 12 after being serviced at service node 14(3). According to a virtual topology the service chain may be illustrated as contiguous nodes in a sequential chain; according to a physical topology, each service node 14(1)-14(3) may comprise virtual machines instantiated in separate (or the same) server, for example, servers 18(1)-18(3), respectively. Source node 16 may also be instantiated as a virtual machine in another (or the same) server 18(4). Note that network 12 may include any number of servers within the broad scope of the embodiments. All packets flowing into and out of network 12 may be routed accordingly by a gateway 20.

According to various embodiments, each server 18(1)-18(4) may include (or be connected to) a forwarder 22. For example, forwarder 22 may be implemented on separate fabric interconnects connected to each server rack. Although forwarder 22 can comprise a single entity in its logical manifestation, in its physical manifestation, it may comprise multiple instances distributed across the multiple servers (e.g., 18(1)-18(4)) in network 12. Forwarder 22 may comprise a flow table 24 and a forwarding table 26 for forwarding packets traversing network 12. In a specific embodiment, packets serviced by a last service node (e.g., 14(3)) in a service chain may be processed by forwarder 22 before forwarding on to the next node. Various embodiments of communication system 10 may ensure bi-directional flow stickiness when load-balancing to an elastically scaled set of virtual service functions (e.g., service nodes 14(1)-14(3)) in spite of network address translation (NAT).

In a general sense, the term "service node" comprises an instance of a service function (e.g., NAT, firewall, Deep Packet Inspection (DPI), Lawful Intercept (LI), etc.) executing on a physical or virtual network element. In some embodiments, each service node 14(1)-14(3) can represent separate instances of the same service function; in other embodiments, each service node 14(1)-14(3) can represent a separate instance of different service functions; in yet other embodiments, some service nodes (e.g., 14(1) and 14(2)) may represent two instances of the same service function and other service nodes (e.g., 14(3)) may represent an instance of a different service function.

As used herein, the term "network element" is meant to encompass computers, network appliances, servers, routers, switches, gateways, bridges, load balancers, intrusion detection appliances, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. The term "service chain" refers to one or more service functions chained (e.g., connected, attached, coupled, etc.) in a specific order to provide a composite service to packets traversing the network.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Network services are widely deployed and essential in many networks. Each network service can include multiple individual service functions, such as security, wide area network (WAN) acceleration, and server load balancing. Service functions that form part of an overall composite service may be physically located at different points in the network infrastructure, such as the wide area network, data center, enterprise, campus, etc. For some network services, traffic is forwarded through a sequence of service nodes providing the service functions. Forwarding traffic along a sequence of service nodes is typically based on service characteristics. For example, certain traffic may be directed to a domain border gateway for monitoring and charging; certain other traffic may be steered through a load balancer to distribute performance pressure before forwarding to data center services; mobile network operators may split mobile broadband traffic and steer them along different offloading paths; firewalls may be used to filter traffic for Intrusion Detection System (IDS)/Intrusion Protection System (IPS); security gateways may be used to encrypt/decrypt traffic; certain traffic that traverses different network technology segments such as IPv4/IPv6 may be directed to a carrier grade network address translator (CGNAT); etc.

An emerging approach in various networks, such as service provider networks, enterprise networks, and campus networks is to virtualize network services and host them in a data center. A network infrastructure-as-a-service (NIAAS) establishes appropriate network connectivity between the different service nodes and the network edge (data center interconnect (DCI)). Unlike physical appliance based approaches, a virtualized network service provides the opportunity to scale the network services up or down based on dynamic capacity demands of traffic. However, elastically scaling network services (and service functions) can pose a problem with the network infrastructure having to pin a flow in both directions to a given service node.

An additional complexity arises if the service node performs NAT. NAT is a commonly used service function in network services such as Server Load Balancers (SLB), firewalls, etc. NAT serves to conserve the IP addresses, maintain traffic affinity, and enforce security, among other uses. NAT may be used to map each address of one address space to a corresponding address in another space; NAT may also be used in conjunction with network masquerading (or IP masquerading) to hide an entire IP address space, usually consisting of (hidden) network IP addresses behind a single IP address in another, (usually public) address space. NAT service function is typically performed using stateful translation tables to map the hidden addresses into a single IP address and to readdress the outgoing IP packets on exit so they appear to originate from a routing device at the network edge. In the reverse communications path, responses are mapped back to the originating IP addresses using rules (e.g., state) stored in the translation tables.

NAT poses many challenges to the service chaining architecture. For example, the network infrastructure cannot relate the service chain to the flow after the NAT transformation, because NAT changes the flow tuple, including the service characteristics. IN addition, address translating service nodes may translate source Internet Protocol (IP) addresses (source-NAT), destination IP addresses (destination-NAT) and/or other properties of the flows; only the NAT service node may know the exact mapping of flows in the forward and reverse directions. Further, NAT requires flows to be always steered through the service node as the NAT service function is based on the translation specific to the service node. Getting the translation (e.g., mapping) from the NAT service nodes may not be practical if the service node itself is not under control of the network infrastructure and exposes no standard interface to query any state of the flow tables. Also, most networks do not provide such information to be queried using an external application programming interface (API) in real-time.

Communication system 10 is configured to address these issues (among others) to offer a system and method for bi-directional flow stickiness in a network environment. According to various embodiments, forwarder 22 may receive a packet of a flow 1 from a source address corresponding to source node 16 in network 12, and destined to a destination address outside network 12. Forwarder 22 may look up flow table 24 for an entry corresponding to flow 1, and if the lookup results in a miss, forwarder 22 may cache a forward flow entry and a reverse flow entry in flow table 24. The forward flow entry may indicate a routing lookup, and the reverse flow entry may indicate a previous hop from which the packet was received to maintain a bi-directional flow stickiness. Some embodiments also include forwarder 22 receiving another packet from the destination address outside network 12 destined to the source address corresponding to source node 16 (e.g., reverse traffic of flow 1). Forwarder 22 may forward the packet to the previous hop listed in the reverse flow entry.

In some embodiments, the forward flow entry can include an action to look up forwarding table 26, which includes a result of the routing lookup. Accordingly, forwarder 22 may look up forwarding table 26. In various embodiments, forwarding table 26 may comprise an action to forward the packet to gateway 20 (e.g., for packets going out of network 12). Each entry in flow table 24 may include at least a source address field, a destination address field, and a next action field. Thus, the forward flow entry for flow 1 may include the source address (of source node 16) in the source address field, the destination address in the destination address field, and an instruction to lookup forwarding table 26 in the next action field. On the other hand, the reverse flow entry comprises the destination address in the source address field, the source address (of source node 16) in the destination address field, and an instruction to forward to the previous hop in the next action field.

In some embodiments, the previous hop may be a last service node (e.g., 14(3)) that performs network address translation (NAT) on the packet, transforming the source address to a translated source address. In such scenarios, the forward flow entry and the reverse flow entry may identify packets of the flow based on the translated source address. Note that any number of flows may traverse network 12, the flows being associated with respective forward flow entries and a reverse flow entries in flow table 24.

In some embodiments, network connectivity from source node 16 through service nodes 14(1)-14(3) to gateway 20 may be provided by forwarder 22 instantiated in servers 18(1)-18(4). Note that an instance is a specific realization of a software object. In some embodiments, when forwarder 22 is instantiated in multiple servers 18(1)-18(4), multiple substantially identical instances of forwarder 22 may be realized (and execute) in each server 18(1)-18(4). In other embodiments, when forwarder 22 is instantiated in multiple servers 18(1)-18(4), each instance may be separate and distinct from the other instances. Thus, each instance of forwarder 22 may include separate flow table 24, whose contents may be different from the content of flow tables in other instances. Each virtual machine in servers 18(1)-18(4) may be attached to forwarder 22 as the first hop network switch/router. Upon reception of a packet from source node 16, forwarding table rules in forwarder 22 may dictate how to handle the packet (e.g., forward to the first service node (e.g., 14(1)) in the service chain towards the destination of the packet).

According to some embodiments, after first service node 14(1) processes the packet, it sends it to forwarder 22, which then uses forwarding table rules to determine the next-service node (e.g., 14(2)) in the service chain and so on. In some embodiments, one instance of forwarder 22 may encapsulate the packet in a tunnel header and send the packet towards another instance of forwarder 22 that services the next service node in the service chain. Note that when there is more than one service node in each service hop (e.g., more than one service node instantiated in servers 18(1)-18(4)), instances of forwarder 22 sending traffic to a given service node could be more than one and essentially distributed across entire network 12.

Given that each service in the service chain can be elastically scaled, a sticky entry in every instance of forwarder 22 may be created along the path after a flow has been identified through n-tuple classification (e.g., based on fields such as source-IP-address, destination-IP-address, source-port, destination-port, protocol and so on) so that subsequent packets of the flow are serviced by the same service node. Forwarder 22 may maintain flow table 24 to create the flow entries.

In various embodiments, forwarder 22 may look up the flow table first for every packet to determine if there is a matching flow table entry. If there is a matching flow table entry, forwarder 22 may honor the next-service-node entry that is cached in the matching flow table entry. If there is no matching flow table entry, forwarder 22 may revert to its regular lookup (e.g., L2 or L3 lookup) logic to determine a suitable next service hop. The flow table entry in forwarder 22 may be maintained as long as the flow is alive. The state of the flow (e.g., whether it is alive or dead) may be heuristically determined based on data plane activity for that flow. For example, on expiration of a timeout where no data plane activity is detected, the flow table entry can be removed from the flow table. The timeout may be preconfigured on a per flow table entry basis.

However, ensuring flow stickiness in one direction alone is not sufficient when the reverse flow has to go through the same service node (e.g., because services are state-full with respect to connections, or a need exists to inspect the flow in the reverse direction to properly process the connection (e.g., NAT, firewall), etc.). If the packets of the reverse flow end up on a different service node that does not hold the flow state, the packets can be dropped and bi-directional connection would not be established.

In some embodiments, a hash algorithm in both forward and reverse directions on forwarder 22 may be created, sending traffic to a scaled set of service nodes such that an identical hash value is computed in spite of the fact that the fields of the packet are reversed. If such a commutative hash is employed, then as long as the list of service nodes on the distributed forwarder 22 is identically programmed by the control plane for load-balancing, the forward and reverse flows would end up in the same service appliance. However, the hash algorithm may not work if the service node performs address translation (S-NAT, D-NAT, 6-to-4 translations, etc.). In such cases, only the service node is aware of the exact mapping of flows in either direction.

According to some embodiments, forwarder 22 may maintain a next-service-hop and a previous-service-hop in its cached flow table entry on flow entry creation. The previous-service-hop may be created as the next-hop entry for the flow table entry that forwarder 22 creates after swapping the {source-ip, destination-ip} and {source-port, destination-port} fields. Because the reverse flow entry has been created during the first few packets in the forward direction but with key fields swapped, the reverse flow can match that flow table entry and may be forwarded to the same service node that processed the forward flow entry.

Such an approach can work irrespective of the type of packet processing done by the service node (such as NAT). For example, forwarder 22 may substantially always be presented with identical key fields in both directions as forwarder 22 is either before or after the packet processing done by the NAT service node. Additionally there is no requirement to have a distributed control plane or packet inspection by the control plane to establish the bi-directional flow stickiness.

Turning to the infrastructure of communication system 10, the network topology can include any number of servers, hardware accelerators, virtual machines, switches (including distributed virtual switches), service nodes, routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, service nodes 14(1)-14(3) can comprise physical service appliances (e.g., stand-alone boxes) plugged into network 12 appropriately. In other embodiments, service nodes 14(1)-14(3) can comprise service cards attached internally within another network element, such as a router or switch in network 12. In yet other embodiments, service nodes 14(1)-14(3) can comprise virtual applications executing on suitable network elements (e.g., servers, switches, routers, etc.) in network 12. In some embodiments, service nodes 14(1)-14(3) can comprise a combination of the above.

In various embodiments, forwarder 22 may comprise one or more applications executing on suitable network elements (e.g., fabric interconnects, switches, servers 18(1)-18(4), etc.) to perform the operations described herein. In some embodiments, forwarder 22 may comprise a distributed application executing in a plurality of network elements. Note that any suitable number of instances of forwarder 22 may be instantiated in network 12 within the broad scope of the embodiments.

Source node 16 may represent any suitable network endpoint. In various embodiments, source node 16 may comprise separate applications (e.g., server/client applications) executing in client-server network architecture) executing in suitable computing devices (e.g., servers). In other embodiments, source node 16 may comprise separate virtual machines on the same or different computing devices (e.g., server blades in a data center). In some embodiments, source node 16 may include server blades configured in one or more chassis. In yet other embodiments, source node 16 may represent a mobile device, such as a cellular phone, laptop, tablet, or smartphone. In various embodiments, gateway 20 may represent a network edge device, such as an edge router, through which substantially all packets entering and leaving network 12 traverse. Note that any number of servers, service nodes, source nodes, gateways, etc. may be activated in network 12 within the broad scope of the embodiments.

Note that servers 18(1)-18(3) can include multiple physical servers (e.g., rack or blade servers) configured with, or connected to other appropriate network elements (e.g., switches, fabric interconnects, etc.) to enable connectivity in network 12. For example, although not explicitly indicated in the figure, each server 18(1)-18(3) may include a separate fabric interconnect configured with the appropriate forwarder instance to enable communication with other servers, gateway 20 and applications (including service nodes) executing in the respective servers.

Figure 2:
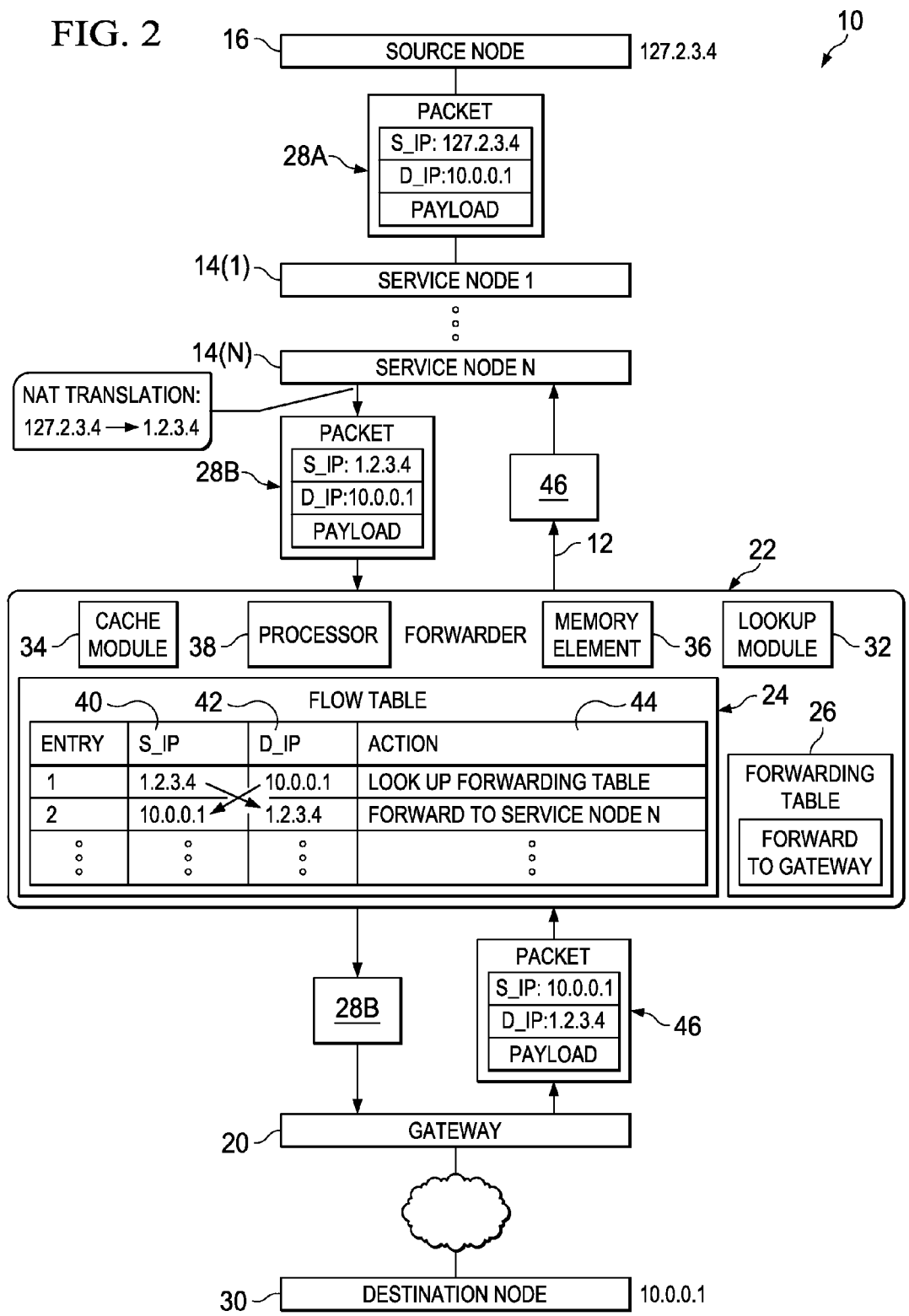
FIG. 2 is a simplified block diagram illustrating example details of embodiments of the communication system.

Turning to FIG. 2, FIG. 2 is a simplified block diagram illustrating example details of an embodiment of communication system 10. Assume that source node 16 has an IP address of 127.2.3.4 in network 12 and sends a first packet 28A of flow 1, packet 28A being destined to a destination node 30 having IP address 10.0.0.1 and outside network 12. Packet 28A may be subjected to a service chain comprising service nodes 14(1)-14(N), where N is any integer greater than or equal to 1. Assume, merely as an example and not as a limitation, that the last service node 14(N) performs NAT, translating source address 127.2.3.4 to 1.2.3.4. Packet 28A may be regenerated to 28B, which indicates a source IP address of 1.2.3.4 and a destination address (unchanged) of 10.0.0.1.

Packet 28B may be received at forwarder 22, which can comprise a lookup module 32, a cache module 34, a memory element 36 and a processor 38, in addition to flow table 24 and forwarding table 26. Flow table 24 may include a source address field 40, a destination address field 42, and an action field 44. When packet 28B is received at forwarder 22, lookup module 32 may perform a lookup of flow table 24. As packet 28B is a first one of flow 1 seen by forwarder 22, the lookup of flow table 24 may result in a miss. Cache module 34 may cache two entries corresponding to flow 1 in flow table 24: a first (forward flow) entry comprising the translated source IP address 1.2.3.4 in source address field 40, destination IP address of 10.0.0.1 in destination address field 42 and a next action to lookup forwarding table 26 in action field 44; and a second (reverse flow) entry comprising the destination IP address of 10.0.0.1 in source address field 40, the source IP address of 1.2.3.4 in destination address field 42, and a next action to forward to the previous hop, namely, service node 14(N) in action field 44. Note that the source address field value and destination address field values of the forward flow entry are swapped (e.g., reversed) in the reverse flow entry. Forwarding table 26 may include a single entry to forward substantially all outgoing packets to gateway 20. Accordingly, packet 28B may be sent out to gateway 20, which may route it to destination node 30 at 10.0.0.1.

Assume that destination node 30 sends a return packet 46 of flow 1. Return packet 46 may indicate a source address of 10.0.0.1 and a destination address of 1.2.3.4. Gateway 20 may forward return packet 46 to forwarder 22. Lookup module 32 may lookup flow table 24 and find a hit in the reverse flow entry (entry 2) with the source address and destination address of return packet 46 matching the values in source address field 40 and destination address field 42, respectively. According to the next action value in action field 44, forwarder 22 may forward return packet 46 to service node 14(N). Service node 14(N) may translate the destination address from 1.2.3.4 to 127.2.3.4 and forward return packet 46 to the previous hops of the service chain as appropriate, with return packet 46 ultimately reaching source node 16, after traversing substantially all service nodes 14(1)-14(N) of the service chain.

Figure 3:
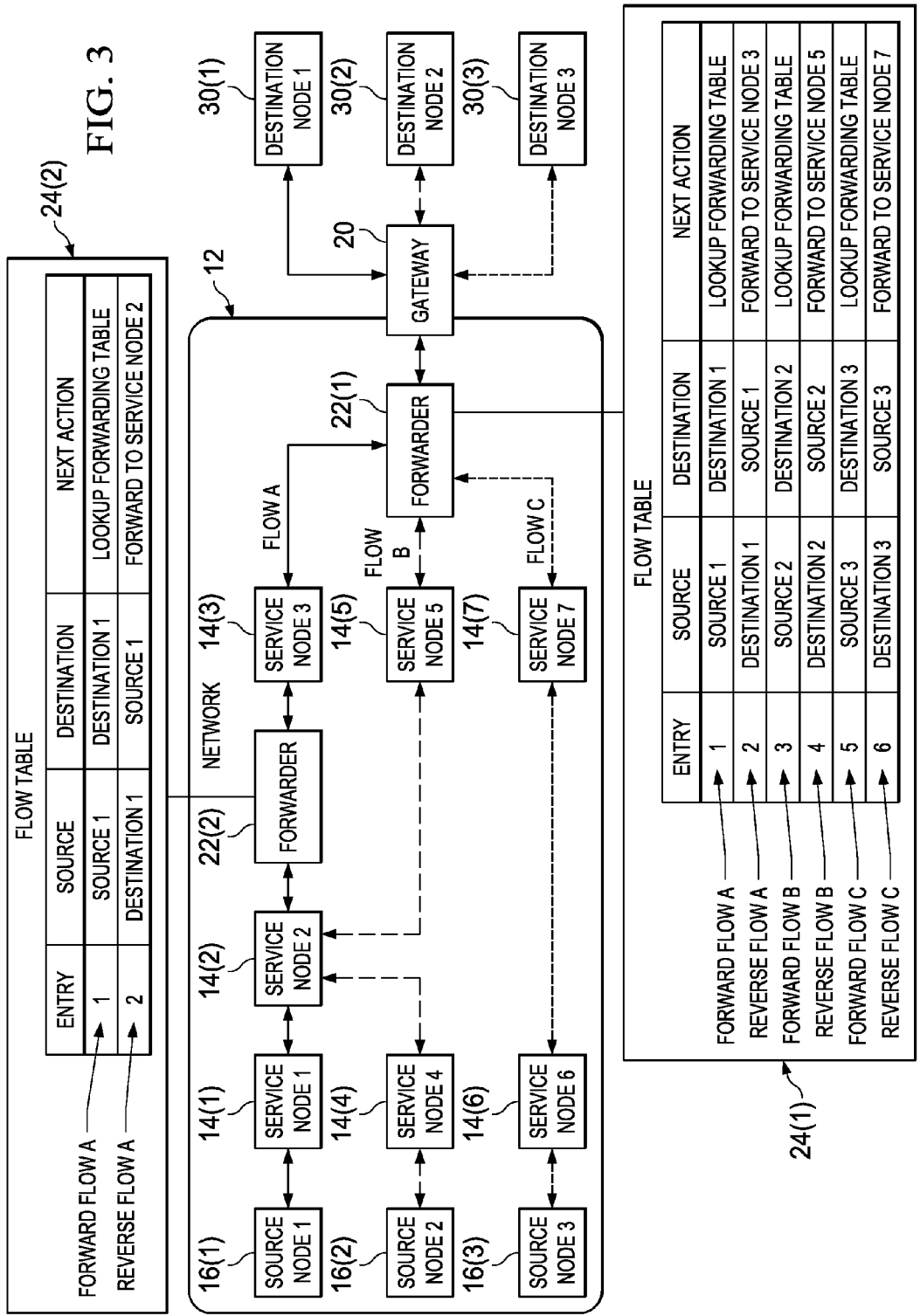
FIG. 3 is a simplified block diagram illustrating other example details of embodiments of the communication system.

Turning to FIG. 3, FIG. 3 is a simplified block diagram illustrating example details of an embodiment of communication system 10. Assume, merely for example purposes and not as a limitation, that source nodes 16(1)-16(3) in network 12 communicate with destination nodes 30(1)-30(3), respectively in corresponding flows A, B and C. Packets in flow A may traverse service nodes 14(1), 14(2), and 14(3) before exiting network 12 through gateway 20 and vice versa (e.g., return packets from destination node 30(1) may traverse the same service node in reverse order); packets in flow B may traverse service nodes 14(4), 14(2) and 14(5) before exiting network 12 through gateway 20 and vice versa; packets in flow C may traverse service node 14(6), and 14(7) before exiting network 12 through gateway 20 and vice versa. Packets from source nodes 16(1)-16(3) to respective destination nodes 30(1)-30(3) may be sent from the last service nodes (e.g., 14(3), 14(5) and 14(7)) to forwarder 22.

Flow table 24(1) maintained in forwarder 22(1) may include a forward flow entry and reverse flow entry corresponding to each flow A, B and C. For example, forward flow entry for flow A may indicate a source address value SOURCE 1, a destination address value DESTINATION 1 and a next action to lookup forwarding table 26; the reverse flow entry for flow A may indicate a source address value DESTINATION 1, a destination address value SRC 1 and a next action to forward to service node 14(3). Likewise, the forward flow entry for flow B may indicate a source address value SOURCE 2, a destination address value DESTINATION 2 and a next action to lookup forwarding table 26; the reverse flow entry for flow B may indicate a source address value DESTINATION 2, a destination address value SOURCE 2 and a next action to forward to service node 14(5). Similarly, the forward flow entry for flow C may indicate a source address value SOURCE 3, a destination address value DESTINATION 3 and a next action to lookup forwarding table 26; the reverse flow entry for flow C may indicate a source address value DESTINATION 3, a destination address value SOURCE 3 and a next action to forward to service node 14(7). Thus, return packets of flow A may be forwarded by forwarder 22(1) to service node 14(3) consistently, maintaining bi-directional flow stickiness. Return packets of flow B may be forwarded by forwarder 22(1) to service node 14(5) consistently; and return packets of flow C may be forwarder by forwarder 22 to service node 14(7) consistently.

Note that in some embodiments, the forwarder may also be instantiated in between service nodes, for example, forwarder 22(2) between service nodes 14(2) and 14(3). In an example embodiment, forwarder 22(2) may be instantiated and associated with a server executing service node 22(2). In some embodiments, the forward flow entry in flow table 24(2) may indicate an action to look up the local copy of the forwarding table; the reverse flow entry in flow table 24(2) may indicate forwarding to service node 14(2). In other embodiments, the forward flow entry in flow table 24(2) may specify (e.g., instead of looking up forwarding table 26 for a routing decision) the next service node (e.g., 14(3)) in a direction from the source node within network 12 to the destination node outside network 12; the reverse flow entry may specify the previous service node (e.g., 14(2)) from which the packet was received at forwarder 22(2). Thus, each instance of forwarder 22 may facilitate maintaining flow stickiness across the entire service chain from source to destination and vice versa within network 12.

Figure 4:
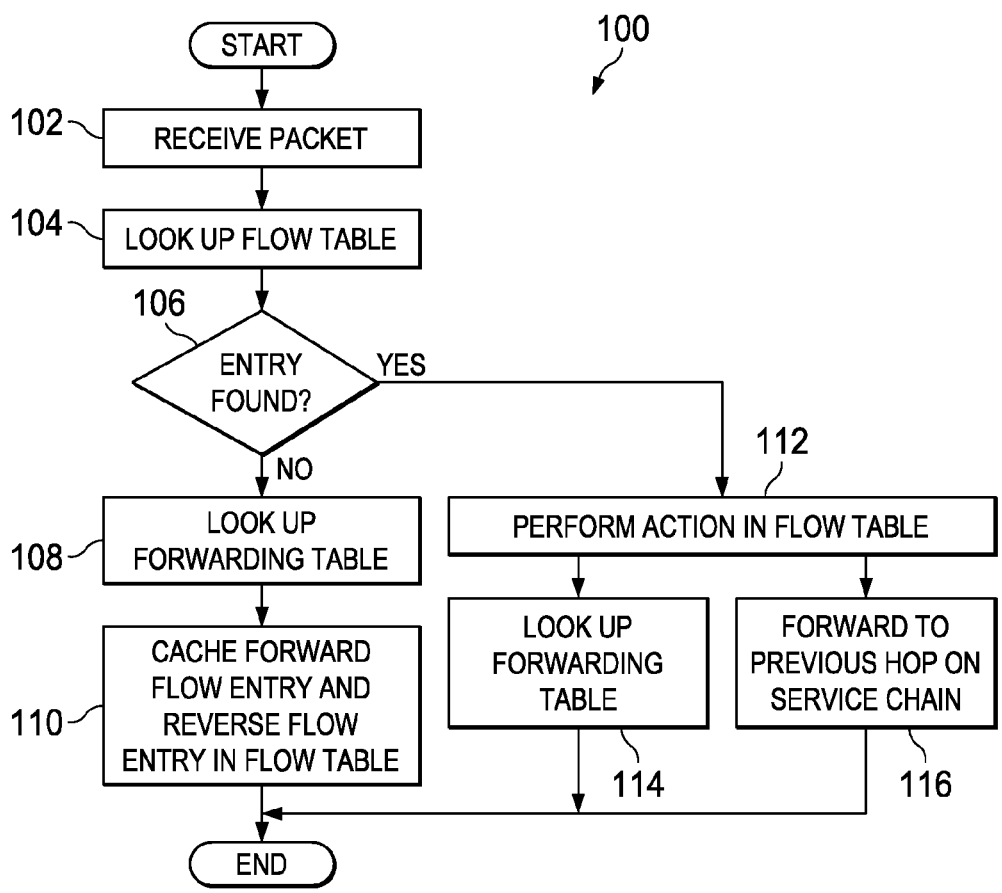
FIG. 4 is a simplified flow diagram illustrating example operations that may be associated with an embodiment of the communication system.

Turning to FIG. 4, FIG. 4 is a simplified block diagram illustrating example operations 100 that may be associated with an embodiment of communication system 10. Operations 100 may execute at forwarder 22 in many embodiments. At 102, a packet may be received at forwarder 22. At 104, lookup module 32 may lookup flow table 24. At 106, a determination may be made whether a corresponding entry has been found (e.g., by searching for the source address and destination address in flow table 24). If an entry has not been found (e.g., a miss), at 108, forwarding table 26 may be looked up for a routing decision. At 110, cache module 34 may cache a forward flow entry and a reverse flow entry in flow table 24.

Turning back to 106, if an entry is found in flow table 24 (e.g., a hit indicating that other packets of the flow have been seen previously or the packet is a reverse flow packet of a forward flow seen previously), at 112, the action specified in flow table 24 may be performed. For example, at 114, forwarding table 26 may be looked up (e.g., hit indicates that other packets of the flow have been seen previously); or at 116, the packet may be forwarded to the previous hop listed in a reverse flow entry (e.g., hit indicates the packet is a reverse flow packet of a forward flow seen previously).

Figure 5:
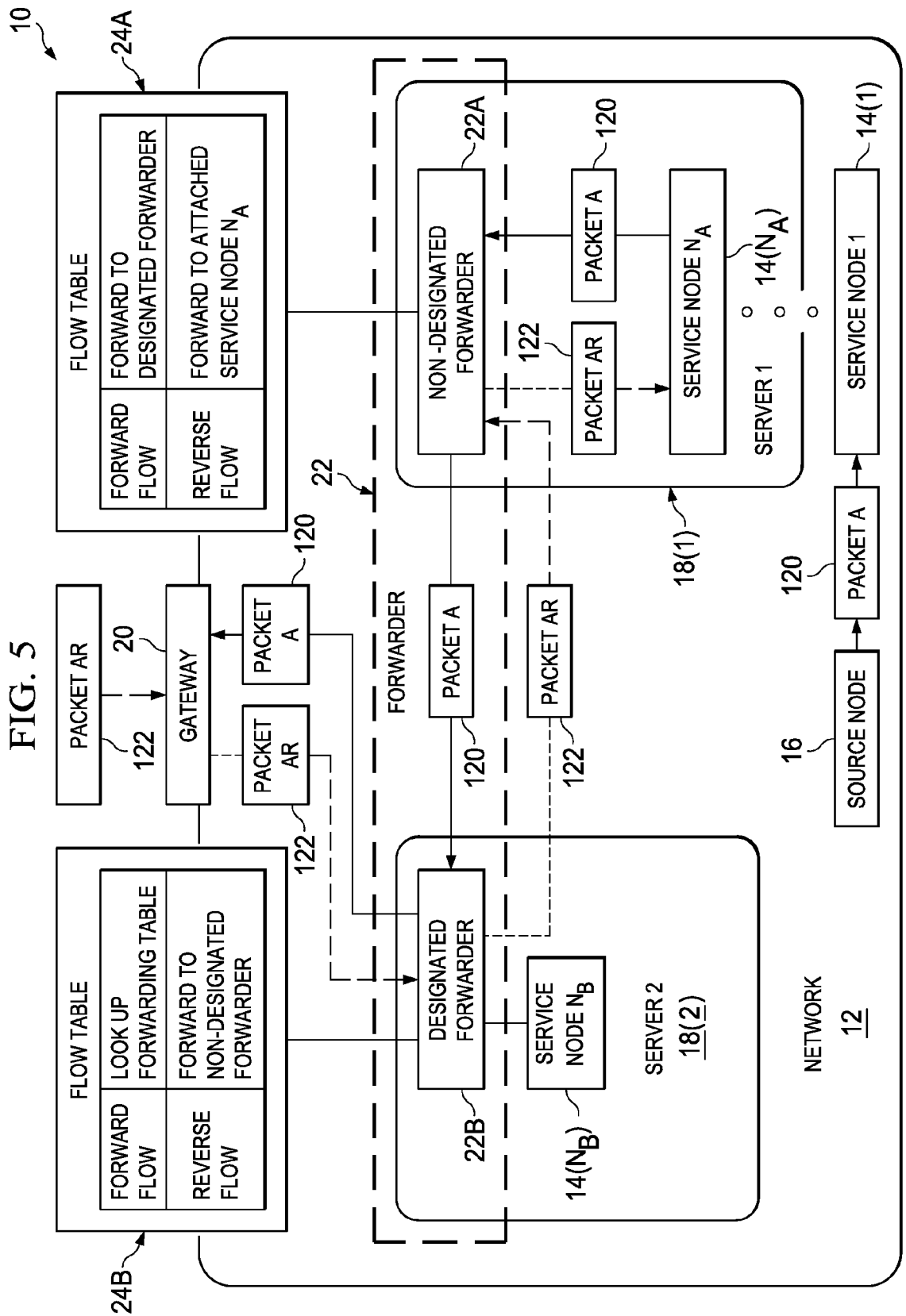
FIG. 5 is a simplified block diagram illustrating yet other example details of embodiments of the communication system.

Turning to FIG. 5, FIG. 5 is a simplified block diagram illustrating example details associated with forwarder 22 according to an embodiment of communication system 10. Note that in network 12, multiple instances of the same service function may be instantiated in separate servers, for example, for elastic scaling purposes. Service function N may be instantiated in two separate instances, $14(N_A)$ and $14(N_B)$ on server 1 and server 2, respectively. Each service node $14(N_A)$ and $14(N_B)$ may be connected to a separate and distinct instance, 22A and 22B respectively, of forwarder 22 on respective servers 18(1) and 18(2). However, only one of such instances of forwarder 22 may forward packets and may be termed as the "designated forwarder." All other instances of forwarder 22 that are not the designated forwarder for the service function may be termed "non-designated forwarder." According to various embodiments, forwarder 22 can encompass the totality of all designated forwarder instance and non-designated forwarder instance(s) connected to separate and distinct instances of the same service function. Moreover, each forwarder 22 may comprise a combination of designated forwarder instance and non-designated forwarder instance for different service functions. For example, designated forwarder instance 22B for service node $14(N_B)$ may act as a non-designated forwarder instance for another connected service node in the same server.

Each designated forwarder instance and non-designated forwarder instances may maintain separate and distinct local copies of flow table 24. For example, designated forwarder instance 22B may maintain flow table 24B; non-designated forwarder instance 22A may maintain flow table 24A. Note that flow table 24 as used herein can refer to an aggregation of substantially all local copies of flow tables maintained by the designated forwarder instance and non-designated forwarder instance(s), unless called out as separate copies, for example, 24A and 24B.

In such a multi forwarder environment, substantially all traffic of the flow passes through the designated forwarder instance, whereas the other non-designated forwarder instances hosting the destination/source of some of the traffic for example, may be sticky only for their destinations/source only. The forwarder instance on a given server can have a different view of the flow table depending on whether it is a designated forwarder instance or a non-designated forwarder instance.

Assume, merely for example purposes, that four service instances are instantiated for the same service function in three separate servers, with two service function instances on two separate servers and two other service function instances on the same server. Each server may include a respective forwarder instance, among which one instance comprises a designated forwarder instance, and the other instances comprise non-designated forwarder instances. Substantially all packets destined to the service function may arrive at the server executing the designated forwarder instance. The designated forwarder instance caches all flows to all service function instances, and directs return traffic based on reverse flows to the right server or to the local forwarder instance. When packets arrive at any non-designated forwarder instance on other servers, the non-designated forwarder instance may direct traffic to their local service nodes (if applicable), based on their cached sticky load balancing flow tables, or else forward the packet to the designated forwarder instance.

Turning back to the example illustrated in the figure, assume, merely for example purposes that source node 16 sends packet A 120 to a destination outside network 12. Packet A 120 traverses a series of service nodes 14(1)-14($N_A$) before reaching forwarder 22 between service node 14($N_A$) and gateway 20. For ease of illustration merely one forwarder 22 is shown in the figure. Any number of forwarders may be included (e.g., one forwarder between each node in the service chain) within the broad scope of the embodiments. Assume, merely for example purposes that forwarder instance 22A connected to service node 14($N_A$) is one of the non-designated forwarder instances for service function N.

During operation, when non-designated forwarder instance 22B receives packet A 120, a lookup of local flow table copy 24A is performed. If an entry is not found, as would be the case for a first packet of a flow, local flow table copy 24A may be cached with a forward flow entry and a reverse flow entry. The forward flow entry may indicate that the packet be forwarded to designated forwarder instance 22B; the reverse flow entry may indicate that the packet be forwarded to service node 14($N_A$). Packet A 120 may be forwarded to designated forwarder instance 22B. Designated forwarder instance 22B may perform a lookup of local flow table copy 24B. If an entry is not found, as would be the case for the first packet of a flow, local flow table copy 24B may be cached with a forward flow entry and a reverse flow entry. The forward flow entry may indicate a lookup of the forwarding table; the reverse flow entry may indicate that the packet be forwarded to non-designated forwarder instance 22A. Packet A 120 may be forwarder to gateway 20 (e.g., according to forwarding table entry) and ultimately out of network 12.

In the return flow, return packet AR 122 may be sent to designated forwarder instance 22B by gateway 20. Designated forwarder instance 22B may perform a lookup of local flow table copy 24B. The reverse flow entry therein may provide a match, indicating that packet AR 122 be forwarded to non-designated forwarder instance 22A. Accordingly designated forwarder instance 22B may forward packet AR 122 to non-designated forwarder instance 22A. Non-designated forwarder instance 22A may perform a lookup of local flow table copy 24A. The reverse flow entry therein may provide a match, indicating that packet AR 122 be forwarded to service node 14($N_A$).

Figure 6:
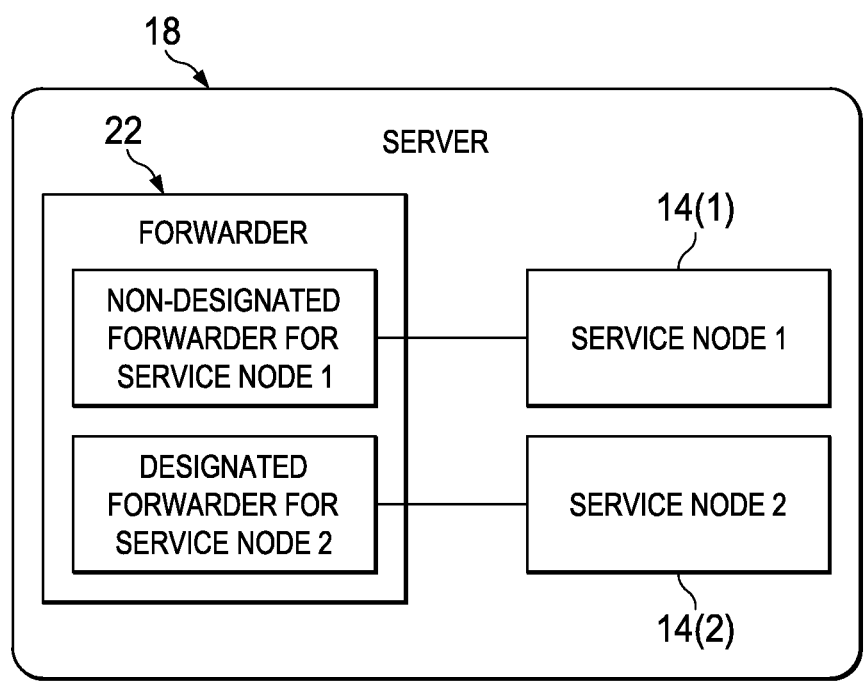
FIG. 6 is a simplified block diagram illustrating yet other example details of embodiments of the communication system.

Turning to FIG. 6, FIG. 6 is a simplified block diagram illustrating example details associated with forwarder 22 according to an embodiment of communication system 10. Forwarder 22 may comprise a combination of designated forwarder and non-designated forwarder for different service functions. For example, forwarder 22 in server 18 may include a non-designated forwarder for service node 14(1) and a designated forwarder for another service node 14(2). The choice to configure forwarder 22 in server 18 as a designated forwarder for service node 14(2) and as a non-designated forwarder for service node 14(1) may be based on various factors, such as load balancing, flow statistics, server capabilities, and other parameters.

Figure 7:
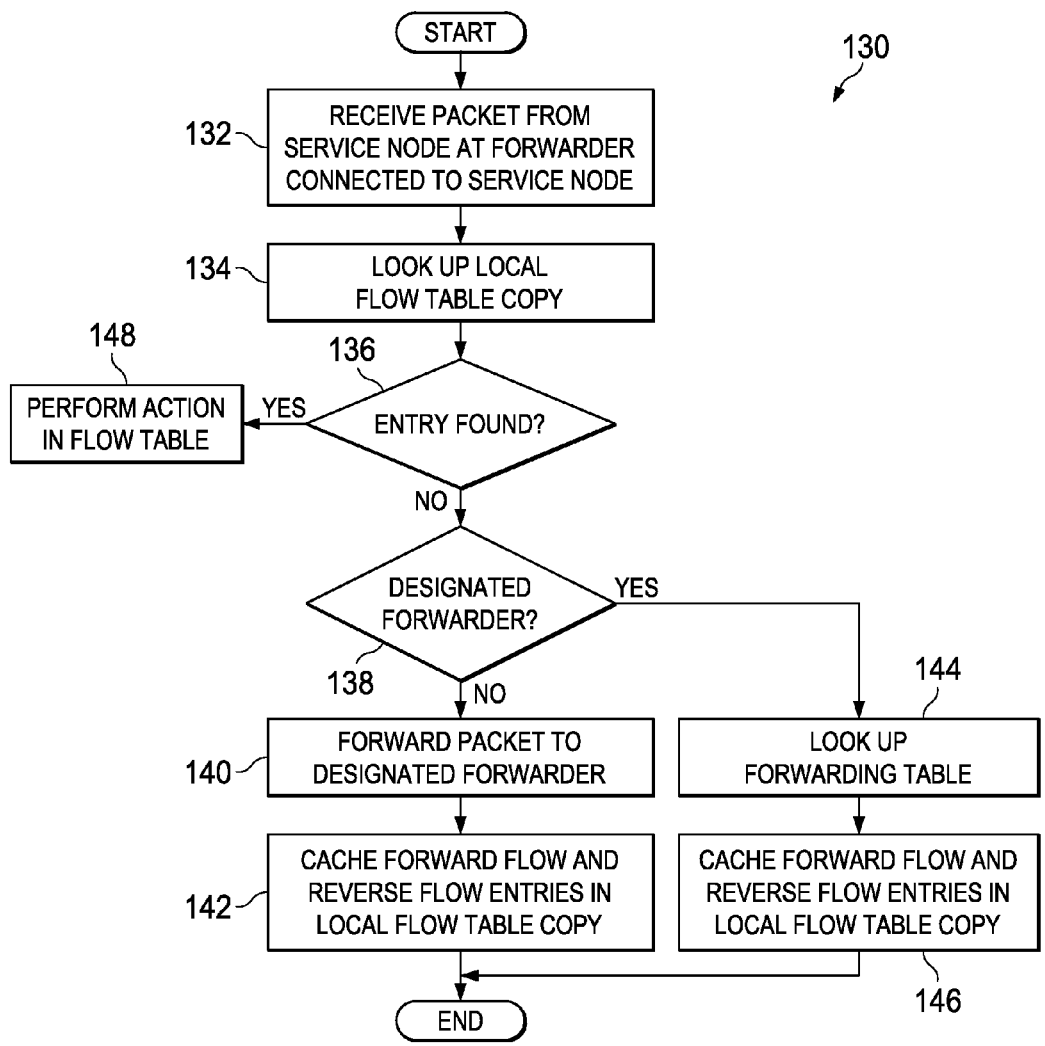
FIG. 7 is a simplified flow diagram illustrating other example operations that may be associated with an embodiment of the communication system.

Turning to FIG. 7, FIG. 7 is a simplified flow diagram illustrating example operations 130 that may be associated with forwarder 22 according to various embodiments of communication system 10. At 132, a packet may be received from service node 14 at forwarder 22 connected to service node 14. At 134, a local flow table copy may be looked up. At 136, a determination may be made whether a matching entry is found in the local flow table copy. If the matching entry is not found, at 138, a determination may be made whether the forwarder instance is a designated forwarder instance. If not, at 140, the packet may be forwarded to the designated forwarder instance. At 142, forward flow and reverse flow entries may be cached in the local flow table copy. The forward flow entry may indicate that the packet be forwarded to the designated forwarder instance; the reverse flow entry may indicate that the packet be forwarded to service node 14.

On the other hand, if the forwarder instance is a designated forwarder instance, at 144, the forwarding table may be looked up to determine the next hop. At 146, forward flow and reverse flow entries may be cached in the local flow table copy. The forward flow entry may indicate that the packet be forwarded to the next hop; the reverse flow entry may indicate that the packet be forwarded to the non-designated forwarder instance, if applicable (e.g., packet received from non-designated forwarder instance), or service node 14 (e.g., packet received from service node 14). Turning back to 136, if a matching entry is found in the local flow table copy, at 148, the appropriate action (e.g., forwarding to designated forwarder instance; looking up forwarding table; forwarding to non-designated forwarder instance; forwarding to service node; etc.) specified in the flow table may be performed.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, forwarder 22. In some embodiments, one or more of these features may be implemented in hardware, provided external to these elements, or consolidated in any appropriate manner to achieve the intended functionality. The various network elements (e.g., forwarder 22) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, forwarder 22 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 36) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 38) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed at a forwarder in a network, the method comprising:
receiving a packet of a forward flow from a service node in the network, wherein the forward flow is subject to a plurality of service functions performed at respective service nodes in the network between a source of the packet in the network and a destination of the packet outside the network, wherein the packet is processed at the service node according to a particular service function;
looking up a flow table for an entry corresponding to the forward flow; and
if the look up results in a miss, caching a forward flow entry in the flow table, the forward flow entry indicating an action comprising an instruction to look up a forwarding table if the forwarder is a designated forwarder, and another instruction to forward the packet to the designated forwarder if the forwarder is a non-designated forwarder, wherein the designated forwarder for the particular service function is the only forwarder that can forward packets of the forward flow to a different service function or to a gateway according to the forwarding table, wherein the non-designated forwarder for the particular service function can only forward packets of the forward flow to the designated forwarder; and
generating a reverse flow entry in the flow table indicating another action to forward any packets in a reverse direction of the forward flow to a previous hop from which the packet was received, wherein the previous hop comprises the service node if the service node is directly connected to the forwarder, wherein the previous hop comprises the non-designated forwarder if the service node is not directly connected to the forwarder, wherein packets in the reverse direction of the forward flow traverse the respective service nodes in reverse direction, wherein the reverse flow entry facilitates maintaining a bi-directional flow stickiness with respect to the service nodes.

2. The method of claim 1, wherein the forwarding table includes a result of a routing lookup.

3. The method of claim 2, further comprising looking up the forwarding table.

4. The method of claim 2, wherein the forwarding table comprises an action to forward the packet to a gateway of the network.

5. The method of claim 1, wherein each entry in the flow table comprises at least a source address field, a destination address field, and a next action field.

6. The method of claim 5, wherein the forward flow entry comprises the source address in the source address field, the destination address in the destination address field, and the action in the next action field.

7. The method of claim 5, wherein the reverse flow entry comprises the destination address in the source address field, the source address in the destination address field, and the another action to forward to the previous hop in the next action field.

8. The method of claim 1, wherein the service node performs network address translation (NAT) on the packet, wherein the NAT transforms the source address to a translated source address, wherein the forward flow entry and the reverse flow entry identify packets of the forward flow based on the translated source address.

9. The method of claim 1, wherein a plurality of forward flows traverse the network, wherein the forward flows are associated with respective forward flow entries and reverse flow entries in the flow table.

10. The method of claim 1, further comprising:
receiving another packet from the destination address outside the network destined to the source address in the network; and forwarding the another packet to the previous hop listed in the reverse flow entry.

11. Non-transitory tangible media that includes instructions for execution, which when executed by a processor of a forwarder, is operable to perform operations comprising:
receiving a packet of a forward flow from a service node in the network, wherein the forward flow is subject to a plurality of service functions performed at respective service nodes in the network between a source of the packet in the network and a destination of the packet outside the network, wherein the packet is processed at the service node according to a particular service function;
looking up a flow table for an entry corresponding to the forward flow; and
if the look up results in a miss, caching a forward flow entry in the flow table, the forward flow entry indicating an action comprising an instruction to look up a forwarding table if the forwarder is a designated forwarder, and another instruction to forward the packet to the designated forwarder if the forwarder is a non-designated forwarder, wherein the designated forwarder for the particular service function is the only forwarder that can forward packets of the forward flow to a different service function or to a gateway according to the forwarding table, wherein the non-designated forwarder for the particular service function can only forward packets of the forward flow to the designated forwarder; and
generating a reverse flow entry in the flow table indicating another action to forward any packets in a reverse direction of the forward flow to a previous hop from which the packet was received, wherein the previous hop comprises the service node if the service node is directly connected to the forwarder, wherein the previous hop comprises the non-designated forwarder if the service node is not directly connected to the forwarder, wherein packets in the reverse direction of the forward flow traverse the respective service nodes in reverse direction, wherein the reverse flow entry facilitates maintaining a bi-directional flow stickiness with respect to the service nodes.

12. The media of claim 11, wherein each entry in the flow table comprises at least a source address field, a destination address field, and a next action field.

13. The media of claim 12, wherein the forward flow entry comprises the source address in the source address field, the destination address in the destination address field, and the action in the next action field.

14. The media of claim 12, wherein the reverse flow entry comprises the destination address in the source address field, the source address in the destination address field, and the another action to forward to the previous hop in the next action field.

15. The media of claim 11, further configured for:
receiving another packet from the destination address outside the network destined to the source address in the network; and
forwarding the another packet to the previous hop listed in the reverse flow entry.

16. An apparatus located in a network, the apparatus comprising:

a forwarder;

a memory element for storing data; and a processor, wherein the processor executes instructions associated with the data, wherein the processor and the memory element cooperate, such that the apparatus is configured for:

receiving a packet of a forward flow from a service node in the network, wherein the forward flow is subject to a plurality of service functions performed at respective service nodes in the network between a source of the packet in the network and a destination of the packet outside the network, wherein the packet is processed at the service node according to a particular service function;

looking up a flow table for an entry corresponding to the forward flow; and if the look up results in a miss, caching a forward flow entry in the flow table, the forward flow entry indicating an action comprising an instruction to look up a forwarding table if the forwarder is a designated forwarder, and another instruction to forward the packet to the designated forwarder if the forwarder is a non-designated forwarder, wherein the designated forwarder for the particular service function is the only forwarder that can forward packets of the forward flow to a different service function or to a gateway according to the forwarding table, wherein the non-designated forwarder for the particular service function can only forward packets of the forward flow to the designated forwarder; and generating a reverse flow entry in the flow table indicating another action to forward any packets in a reverse direction of the forward flow to a previous hop from which the packet was received, wherein the previous hop comprises the service node if the service node is directly connected to the forwarder, wherein the previous hop comprises the non-designated forwarder if the service node is not directly connected to the forwarder, wherein packets in the reverse direction of the forward flow traverse the respective service nodes in reverse direction, wherein the reverse flow entry facilitates maintaining a bi-directional flow stickiness with respect to the service nodes.

17. The apparatus of claim 16, wherein each entry in the flow table comprises at least a source address field, a destination address field, and a next action field.

18. The apparatus of claim 17, wherein the forward flow entry comprises the source address in the source address field, the destination address in the destination address field, and the action in the next action field.

19. The apparatus of claim 17, wherein the reverse flow entry comprises the destination address in the source address field, the source address in the destination address field, and the another action to forward to the previous hop in the next action field.

20. The apparatus of claim 16, further configured for:

receiving another packet from the destination address outside the network destined to the source address in the network; and forwarding the another packet to the previous hop listed in the reverse flow entry.

\* \* \* \* \*